United States Patent [19]

Mele

[11] Patent Number: 4,826,540

[45] Date of Patent: May 2, 1989

[54] ADJUSTABLE DEPTH THERMOCOUPLE SYSTEM

[76] Inventor: Sam Mele, 1610 Kenwood Dr., Bethlehem, Pa. 18017

[21] Appl. No.: 2,111

[22] Filed: Jan. 12, 1987

[51] Int. Cl.$^4$ ............................................. H01L 35/02
[52] U.S. Cl. ................................... 136/221; 136/230; 374/208
[58] Field of Search ....................... 136/221, 230, 217; 285/158, 392; 374/208

[56] References Cited

U.S. PATENT DOCUMENTS

| | | | |
|---|---|---|---|
| 1,675,210 | 6/1928 | Campbell et al. | 136/230 |
| 2,084,992 | 1/1937 | Claypoole | 136/230 |
| 2,161,432 | 6/1939 | Rees | 136/230 |
| 2,266,416 | 12/1941 | Duclos | 136/221 |
| 2,379,317 | 6/1945 | Picciano | 136/221 |
| 2,829,185 | 4/1958 | Macatician et al. | 136/230 |
| 3,468,723 | 9/1969 | Lambert | 136/221 |
| 3,477,122 | 11/1969 | Hamrick | 136/230 |
| 3,519,491 | 7/1970 | Brohall et al. | 285/158 |
| 3,589,192 | 6/1971 | Sabovik | 136/230 |
| 3,679,490 | 7/1972 | Finkbiner | 136/221 |
| 3,751,305 | 8/1973 | Huebscher | 136/221 |
| 3,753,787 | 8/1973 | Webb | 136/221 |
| 3,930,892 | 1/1976 | Fox et al. | 136/217 |
| 4,259,123 | 3/1981 | Tymkewicz | 136/221 |
| 4,558,959 | 12/1985 | Thomas et al. | 136/230 |
| 4,628,141 | 12/1986 | Wieszeck et al. | 136/221 |

OTHER PUBLICATIONS

"Omega 1987 Complete Temperature Meaasurement Handbook and Encyclopedia" Copyright 1986 by Omega Engineering, Inc., p. A-47, Adjustable Depth Thermocouples.

Primary Examiner—Deborah L. Kyle
Assistant Examiner—Michael J. Carone
Attorney, Agent, or Firm—O'Keefe & Wilkinson

[57] ABSTRACT

An adjustable mounting system for a thermocouple temperature detection device includes a thermocouple cable and a bushing type fitting having an externally threaded end for engagement with threads within the thermocouple well or orifice and an internal threading arrangement within the fitting designed for engagement with the flexible spiral surface of the thermocouple cable which may be either the surface of an armored cable or a spring spiraled about the surface of the thermocouple cable. The internal and external threading on the thermocouple fitting are in the same direction. In a variation of the assembly a bayonet-type cap is provided for engagement with a conventional bushing with a bayonet top and the bayonet-type cap has internal threads adapted for engagement with the external threads of the bushing type fitting of the invention.

11 Claims, 3 Drawing Sheets

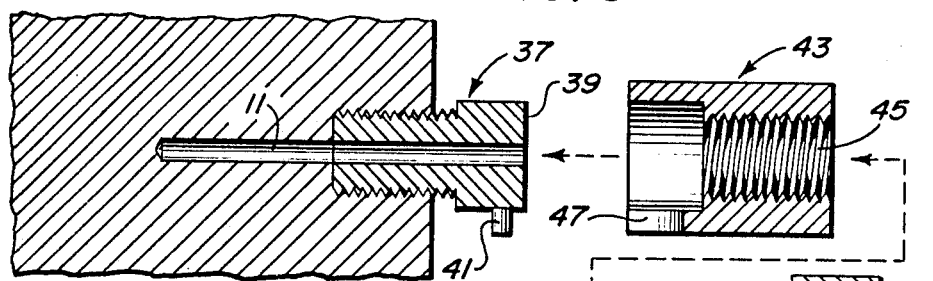
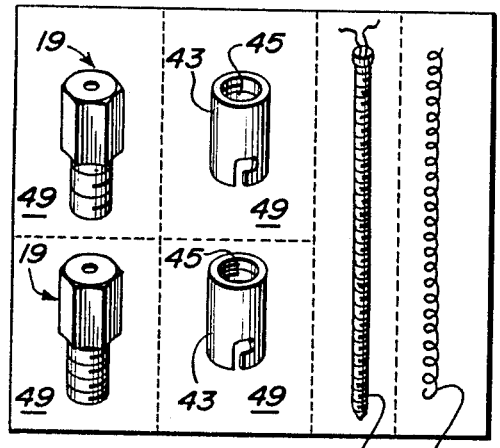
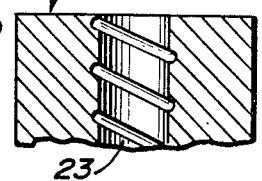
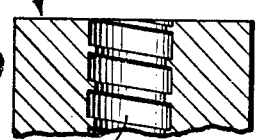
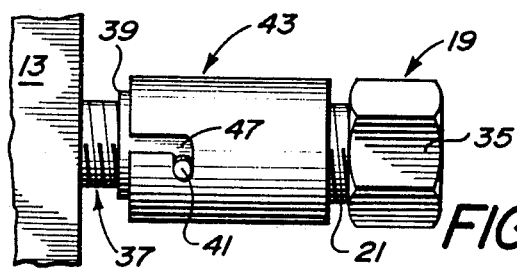
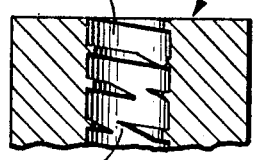
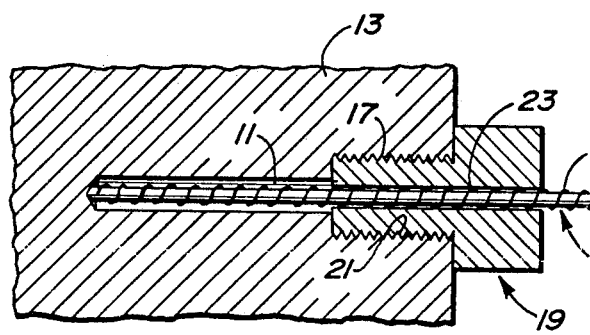

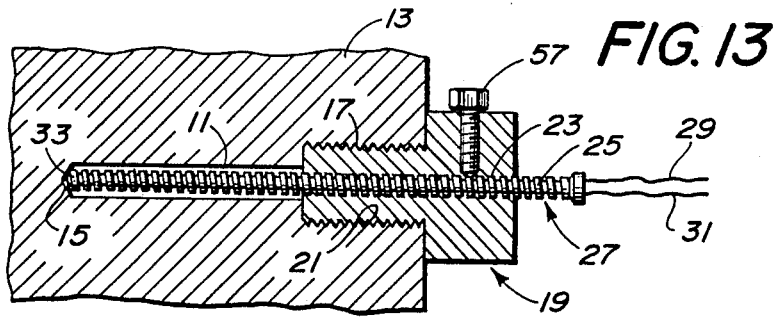
FIG. 13
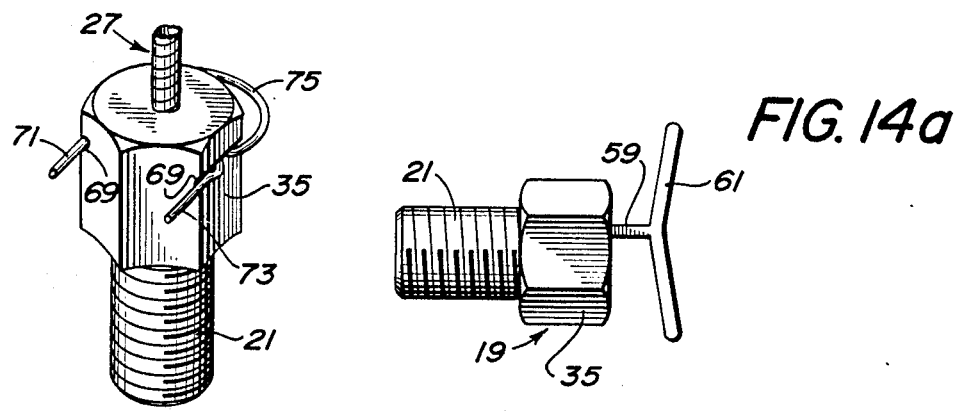
FIG. 14a
FIG. 16
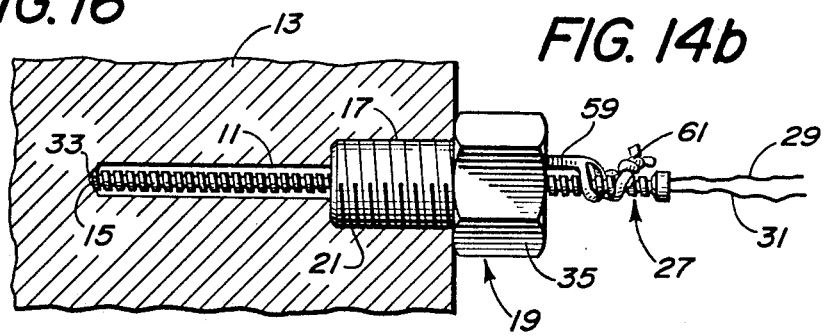
FIG. 14b
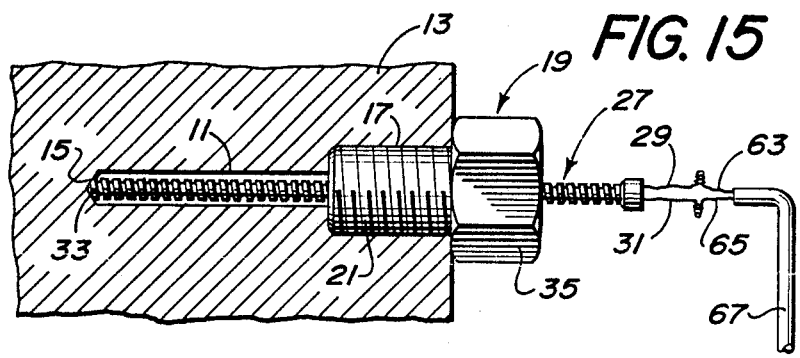
FIG. 15

4,826,540

ADJUSTABLE DEPTH THERMOCOUPLE SYSTEM

BACKGROUND OF THE INVENTION (a) Field of the Invention

This invention relates to temperature measurement by thermocouple means and more particularly to the provision of a simple but effective adjustable thermocouple mounting for use in positioning a thermocouple in proper position for detecting temperatures within a machine.

(b) Description of the Prior Art

Thermocouple type temperature sensors are widely used in industry. One frequent use is for detecting or monitoring the temperature of the interior of a machine such as a plastic working or extrusion machine, as distinguished from measurement of the surface temperature. For such use an opening is usually drilled or otherwise formed in the machine and a temperature sensor such as a thermocouple is inserted into the opening. In order to measure the temperature of the machine itself at such point and not merely the temperature of the air in the opening surrounding the thermocouple it is desirable to contact the temperature detecting end of the thermocouple with the wall of the opening, usually the bottom wall or closed end of a drilled opening. Since the thermocouple is usually rather fragile, it is also usually the custom to contain the thermocouple in a protective tube the end of which is then pressed against the bottom of the detection orifice, i.e. the opening in the machine for the thermocouple.

Various means for mounting the thermocouple in the detection rrifice have been made in the past by which the thermocouple may be adjusted in the detection orifice and maintained constantly against the bottom of the orifice. Exemplary of such mounting means are those shown in U.S. Pat. Nos. 3,468,723 to W. Lambert and 3,679,490 to R. R. Finkbiner. In these mounting devices a bushing is threaded into the upper portion of the thermocouple opening, or detection orifice. The opposite or outer end of the bushing is provided with a coupling pin arranged to interact with a cap designed to be placed over the outer end of the bushing and with which it interlocks in a so-called bayonet type interlock. The interior of the cap is desirably threaded for engagement either with a spiral spring wound about the thermocouple covering as shown in the Lambert patent or with the spirals of a resilient spiral armor about the surface of the thermocouple cable as shown more particularly in the Finkbiner patent. When the thermocouple is mounted in the detection orifice, or well, in the machine it is pressed forcibly against the bottom by the compression of the spring or resilient armor by engagement of the bayonet type cap with the upper or outer end of the bushing threaded into the machine, the body of the thermocouple having been first adjusted within the threads of the cap to extend a suitable length beyond the cap for compression against the bottom of the thermocouple orifice or well.

An alternative arrangement has been suggested in U.S. Pat. No. 4,259,123 to J. Tymkewiecz who in one embodiment uses the usual bayonet cap type arrangement, but in a second embodiment eliminates the bayonet cap and instead inserts an external thermocouple spring through a restricted orifice in the top of the bushing threaded into the machine element. The spring is provided with a spiral in the opposite direction from the direction of the threads on the bushing which engage with threads in the machine. When inserting the thermocouple in the machine the bushing is first adjusted along the thermocouple by engagement with the spiral spring so that the thermocouple extends from bushing the same distance as the distance from the top to the bottom of the detection orifice into which it is to be inserted. The bushing is then threaded into the machine until the thermocouple engages the bottom of the temperature orifice in the machine. The opposite spiral of the spring prevents the thermocouple from backing off in the bushing as the bushing is engaged with the bottom of the temperature orifice and insures intimate engagement of the end of the thermocouple with the bottom of the temperature orifice.

It has been considered necessary by those skilled in the art for effective compression to be applied to the thermocouple for it to be essentially positioned at the correct position and then compressed by engagement of the cap or bushing in which the thermocouple is effectively held with the top of the bushing already threaded into the machine or with the threads of the temperature orifice in the machine whose temperature is to be measured. There have been other suggestions for mounting thermocouples for detection of the interior temperature of machines, but substantially all have, so far as the present inventor is aware, followed basically the same principles as the Lambert and Finkbiner patents in requiring preadjustment of the length of the thermocouple extending beyond a fitting, followed by securing of the fitting or a portion thereof in position such that the thermocouple section is compressed against the bottom of the thermocouple well or orifice. While effective in accomplishing their purpose such prior devices have had certain drawbacks including undue complication and expense for the ends to be attained, particularly in the case of the use of bayonet type fittings, and possible excess compression of the thermocouple with resultant damage and cocking in the temperature orifice, particularly, in the absence of a bayonet cap type fitting. Excess force on the end of the thermocouple can damage the thermocouple or its cable and cocking of the thermocouiple can not only damae it, but prevents proper contact with the bottom of the detection orifice.

SUMMARY OF THE INVENTION

The present invention effectively obviates many of the disadvantages of the prior adjustable thermocouple mountings and is both substantially simpler, more adaptable and more economical than prior art mountings. Potential damage to the thermocouple and improper contact of the thermocouple with the walls of the detection orifice in the machine is also avoided. The mounting adaptor of the invention is preferably provided in several different versions, most preferably as a kit comprising several parts to provide both simplicity and adaptability. In its simplest form it is provided as only a single part or alternatively as a two-part system, one portion of which is the thermocouple cable itself. The invention also encompasses a method of using the system.

Basically the invention comprises a hollow thermocouple fitting having external threads at one end adapted for engagement with threads in or at the opening of the thermocouple orifice or well and internal threads, preferably along a major portion of the hollow interior, adapted for engagement with the spiral surface features of a conventional thermocouple cable. The spiral surface features may comprise either a conventional spiral spring about the surface of the cable, or, in case of an armored cable, the spiral coils of the armor.

The internal thread provided has a configuration which will adapt it either for a spiral spring or for a spiral armored cable, or less preferably either, in which case either a single universally adaptable thread or a double thread may be provided.

In using the fitting of the invention the fitting is first seated in position by threading into the threads at the top of the detection orifice hole. The thermocouple, which will have preferably already been threaded into the spiral threads of the fitting, may then be rotated until it touches the bottom of the thermocouple orifice, or detection orifice, and proper compression of the resilient material at the surface of the cable, i.e. in most cases either a spring or a resilient armored cable, is attained. The thermocouple myy be easily rotated in the threads prior to being connected at its electrical connection and is thereafter held securely in position. The threads on both the interior of the fitting and the exterior are spiraled in the same direction so that minor adjustments of the thermocouple fitting may be made after implacement without substantial change in the position of the cable. If the end of the thermocouple contacts the bottom of the thermocouple or temperature orifice before the bushing is completely or securely threaded into engagement with the threads in the machine, the thermocouple will merely back out of the internal threads in the bushing relieving any excess pressure of the end of the thermocouple against the bottom of the thermocouple orifice. On the other hand, if the end of the thermocouple does not seat securely against the bottom of the thermocouple orifice by the time the bushing is securely seated, the thermocouple may then be easily rotated in the bushing until a suitable amount of reactive pressure is detected indicating intimate contact between the bottom of the temperature orifice and the end of the thermocouple.

The opposite or connective end of the thermocouple may then be attached to the proper leads. Since the thermocouple body is essentially rigid, the attachment of the connective end will serve to prevent backing off of the thermocouple from secure contact with the bottom of the temperature orifice. Alternatively a separate locking means can be provided to prevent subsequent rotation of the thermocouple. One very effective means for such locking is the use of a set screw or the like in the upper portion of the bushing for engagement with the lateral wall of the thermocouple cable.

The principal fitting of the invention is preferably supplied in a kit including in addition to the fitting itself an intermediate bayonet-type cap fitting having an internal screw thread in its top portion adapted to receive the lower porticn of the main principal fitting and adapted at its lower end to engage over a conventional bayonet-type engagement bushing already threaded into a machine. Supply in kit form provides adaptability as it allows the internally-externally threaded fitting of the invention to be used for mounting of a thermocouple even where the male portion of a bayonet-type fitting is already mounted in the machine. The kit preferably will include fittings adapted for engaging the two standard sizes of threads for thermocouple orifices, i.e. ⅛ inch NPT and ⅜ 24 NF threads and may also have separate fittings for engagement with the two types of thermocouple surface spirals, i.e. spring type and armored cable type spirals. Adaptable springs may also be supplied.

It is an object of the present invention therefore to provide a thermocouple fitting which is both simpler, more effective and more eonomical than previous fittings.

It is a further object to provide a thermocouple assembly which enables the thermocouple to be more critically adjusted to provide the proper degree of compression against the terminal end of a thermocouple orifice.

It is a still further object of the invention to provide a method of using the fitting of the invention to adjust thermocouple cable to its best position for temperature recording.

It is an additional object of the invention to provide a thermocouple fitting kit including various parts designed to adapt the basic fitting of the invention to almost any thermocouple assembly arrangement.

Further objects and advantages of the invention will be evident from the following more particular description of the invention and its method of use.

BRIEF DESCRIPTION OF THE DRAWINGS

FIG. 6 is a sectional broken away view illustrating the parts of a variation of the invention.

FIG. 7 shows a kit designed for use in accordance with the invention.

FIG. 8 is an enlarged sectional view of the one type of threads in the bushing type fitting of the invention.

FIG. 9 is a broken away view showing a second type of threads in the bushing type fitting of the invention.

FIG. 10 is a further broken away view of combined internal threads within the bushing type fitting of the invention.

FIG. 11 shows an isometric view of the assembly in accordance with the invention shown in FIG. 6.

FIG. 12 shows a broken away view of substantially the same thermocouple assembly arrangement as in FIG. 1, but applied to a thermocouple having a longitudinal spring spiraled about the thermocouple.

FIG. 13 is a broken away sectional view of a thermocouple assembly similar to that shown in FIG. 1, but with the addition of a locking means in the form of a single set screw frictionally engaging with the surface of the thermocouple.

FIG. 14(a) is an isometric view of a thermocouple fitting such as shown in FIG. 3 or FIG. 1 with the addition of an external locking means for engagement with the thermocouple.

FIG. 14(b) is the same as FIG. 14 except that the end of the locking means has been clamped about the thermocouple to lock it in place.

FIG. 15 shows the fitting of the invention with the leads connected.

FIG. 16 shows the fitting of the invention with an alternative locking means.

DESCRIPTION OF THE PREFERRED EMBODIMENTS

Figure 1:
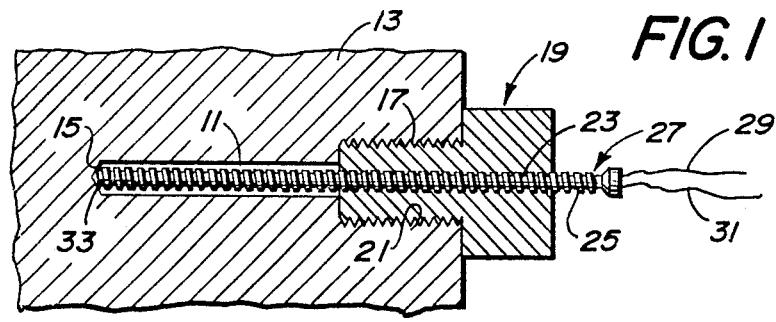
FIG. 1 is a sectional view through a thermocouple well or detection orifice in a machine, the temperature of which must be measured using the basic fitting of the invention.

One version of the Applicant's invention is shown in FIG. 1 as an assembly positioned in a thermocouple well or detection orifice 11 in a machine body 13. The detection orifice 11 has a bottom or terminal end 15. At the top of the detection orifice there are provided threads 17 into which there is shown threaded a bushing type fitting 19 having external threads 21 shown in engagement with the threads 17 in the top of the thermocouple well or detection orifice. The fitting 19 is provided with internal threads 23 for engagement with the spiral surface structure 25 of a standard thermocouple 27. At the top of the thermocouple 27 may be seen the two connection leads 29 and 31. The lower end 33 of thermocouple 27 is shown in contact with the terminal end 15 of the thermocouple well 11.

Figure 2A:
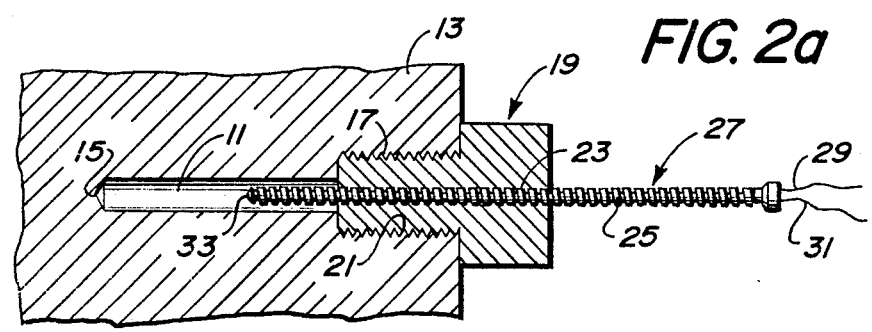
FIG. 2(a) is a further broken away sectional view of the same thermocouple well or orifice with the fitting of the invention in place, but with the thermocouple partially withdrawn from the thermocouple orifice.
Figure 2B:
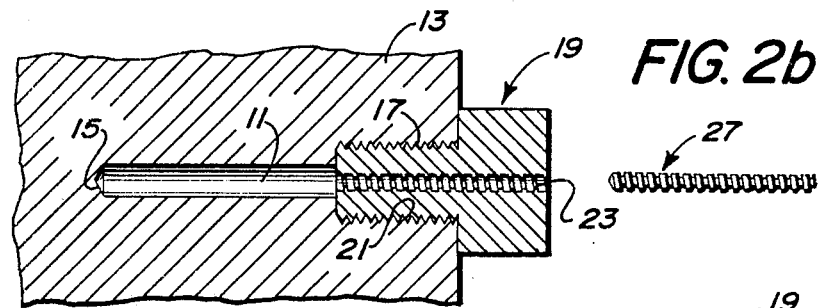
FIG. 2(b) is a further broken away sectional view of the same thermocouple well or detection orifice with the thermocouple substantially completely withdrawn from the orifice.

FIG. 2(b) is a diagrammatic sectional figure of the same thermocouple assembly with the assembly itself disassembled, i.e. the thermocouple 27 has been completely unthreaded from the bushing type fitting 19. FIG. 2(a) shows the thermocouple 27 partially threaded through the fitting 19 by engagement of its threaded surface 25 with the internal threads 23 of the bushing type fitting 19. It can be seen that the thermocuple 27 is positioned such that its end 33 is spaced from the bottom 15 of the thermocouple well 11. It will be understood that the thermocouple 27 will be screwed in the threads 23 until its end 33 comes into good heat transfer contact with the bottom or terminal end 15 of the thermocouple well, or detection orifice, 11 as seen in FIG. 1. Since the connecting leads 29 and 31 of the thermocouple are not at this time connected to anything, the thermocouple 27 can be readily rotated within the threads 23. The threads 23 on the interior of the bushing type fitting 19 and threads 17 on the exterior of the bushing type fitting 19 are formed in the same direction or with the "same hand". As can be seen in the drawings, once the wire leads 29 and 31 at the end of the thermocouple are connected, the thermocouple can no longer be rotated. See in particular FIG. 15 which shows the connecting wires 39 and 31 attached or connected to leads 63 and 65 of thermocouple connection 67. If the bushing type fitting should become loose, the entire fitting may be rotated by a suitable wrench using the hexagonal wrench surface 35 seen in FIG. 3.

If the end of the thermocouple 27 contacts the terminal end of the detection orifice 11 before the bushing type fitting 19 of the invention is completely seated in its threads, the pressure of the terminal end of the detection orifice against the thermocouple will cause the thermocouple to rotate or back off within the fitting to relieve such pressure and the fitting can then be seated without damage to or cocking of the thermocouple. On the other hand, if the thermocouple is still not touching the terminal end of the thermcouple or detection orifice when the fitting is completely seated, the thermocouple may be rotated within the threads of the fitting of the invention until contact with the terminal end of the detection orifice is attained. Very good "feel" is attained by mere rotation of the thermocouple with the fingers and a very accurate estimate of the contact resistance between the bottom or terminal end of the detection orifice and the end of the thermocouple is possible using the invention.

There are three basic procedures by which the thermocouple can be entered and adjusted in the detection orifice in accordance with the invention. In the first of these, the bushing type fitting of the invention can initially be threaded into engagement with the threads in the detection orifice by itself and rotated until completely seated. The thermocouple is then threaded partway into the internal threads of the fitting and rotated until contact is made with the terminal end of the detection orifice. Good control and feel of the thermocouple contact with the terminal end of the orifice is obtained so a very satisfactory, accurate heat conductive contact between the thermocouple and the machine can be attained.

In the second basic method the thermocouple is first threaded into the bushing type fitting of the invention until it extends a significant distance beyond the end of the fitting, but not a sufficient distance to touch the terminal end of thermocouple orifice when the fitting is subsequently seated securely in the threads at the entrance to the thermocouple orifice or detection orifice. After seating of the fitting the thermocouple can be rotated in the internal threads of the fitting until its end contacts the terminal end of the detection orifice at which point the excellent feel provided by the arrangement of the invention enables the thermocouple to be very easily and accurately positioned with an optimum heat conductive contact with the terminal wall of the thermocouple orifice. No damage to or cocking of the thermocouple will be had.

In the third basic method, the thermocouple can again be preliminarily threaded into the fitting of the invention and the fitting then threaded into the threads in the top of the detection orifice. In this case, however, the thermocouple may be deliberately threaded through the internal threads of the fitting until it extends beyond the fitting a distance which is known to be greater than the depth of the thermocouple well or detection orifice. The thermocouple is then inserted into the detection orifice until its end contacts the bottom of the orifice. The fitting of the invention may then be rotated along the thermocouple body until it enters the threads at the top of the detection orifice at which point further rotation to seat the fitting in such threads will cause the thermocouple to back off through the internal threads of the fitting since the internal and external threads are spiraled in the same direction. If the pitch of the internal threads and the external threads of the fitting are the same, rotation of the fitting while seating it in the threads at the top of the detection orifice will cause the fitting to move the same distance along the thermocouple and the thermocouple will not be forced to back out of the fitting. However, it is difficult to attain the same pitch on the internal and external threads since the internal threads must engage usually with a substantially longer spiral. However, no problem will arise since the thermocouple will easily back off through the internal threads of the fitting. The same would be true if the internal threads had a lesser spiral pitch than the external threads of the fitting. This, however, is unlikely and generally undesirable since more frictional resistance to rotation of the thermocouple will be present with a lesser pitch, other things being equal. Of course, if the relative pitches of the internal and external threads of the fitting cause the thermocouple to back out a greater distance than the fitting is threaded into the machine, after final seating of the fitting in the threads of the machine, the thermocouple will again be manually rotated until it is again brought into secure heat conductive relationship with the terminal end of the detection orifice. The thermocouple will, of course, not usually back out more than necessary unless it is held and twisted in some manner.

It will be understood that while only these basic procedures for seating the thermocouple assembly of the invention in a machine element the temperature of which is to be monitored have been specifically described, other variations or combinations of such procedures are possible and within the scope of the invention. Of the three basic procedures, the preferred procedure is in the second wherein the thermocouple is initially partially threaded through the fitting and then after seating of the fitting the thermocouple is again rotated until it is brought into good heat conductive relationship with the terminal end of the detection orifice. It is, of course, desirable in such case that the initial extension of the thermocouple from the fitting shall be as close as practical to the depth of the thermocouple or detection orifice, though not greater, one of the major advantages of the thermocouple assembly of the invention being that if the thermocouple extension is too long due to miscalculation no harm is done since the thermocouple will easily back off to the correct length or to a length which can then be easily adjusted to the correct length for optimum surface to surface contact without damage to the thermocouple.

Figures 3, 4, 5:
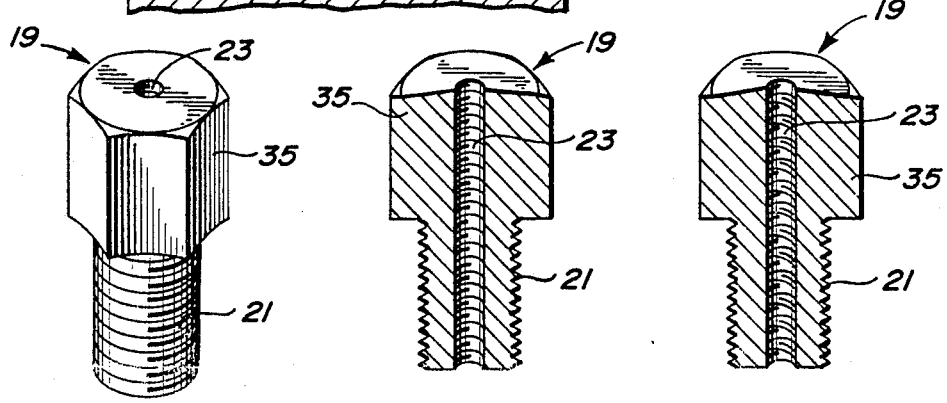
FIG. 3 is an isometric view of the exterior of the fitting shown in FIGS. 1 and 2.
FIG. 4 is a broken away sectional drawing of the bushing type fitting of FIG. 3 showing in section the internal threads of the fitting.
FIG. 5 is a broken away view of a variation of the fitting of FIG. 3 showing a different thread arrangement.

In FIG. 4 there is shown the threads 23 of bushing type fitting 19. The threads are designed for effective engagement with the spiral surface of the thermocouple cable. Such surface may be either the spiral surface of the thermocouple cable or a spring spiraled about the surface of the thermocouple cable. FIG. 5 shows a variation of the threaded internal surface of the bushing type fitting 19 wherein two separate threads 23 and 23' are provided on the same I.D. of the fitting. Two complete spirals are provided which cross each other, but into which either a spiral armored cable or the spiral spring surface of the thermocouple may be threaded. This double thread arrangement is not a preferred embodiment because of the possibility that the cable or spring may be misfed.

FIG. 6 shows a broken away partially disassembled version of the invention in which a conventional bushing 37 is threaded into the top of the thermocouple well 11. The head 39 of the bushing 37 is made in the form of a cylindrical section having a pin 41 extending from one side. A bayonet-type cap 43 is provided for engagement bayonet style with the top 39 of the bushing 37. Cap 43 is provided with internal threads 45 designed for engagement with the external threads 21 on a bushing type fitting 19 such as shown in the previous drawings and shown ready for threading into the threads 45 in FIG. 6. It will be recognized that the provision of the bayonet-type cap 43 having internal threads 45 designed for engagement with the external threads 21 on the bottom of the fitting such as shown in the previous figures and in FIG. 6 allows the fitting 19 to be used with machines which are already provided with a conventional bayonet-type bushing adapter 37. The thermocouple is then adjusted within the internal threads 23 of the bushing type fitting 19 as seen in FIGS. 1, 2(a) and 2(b) and explained in some detail above.

The external appearance of the fitting system of the invention when used in the form shown in FIG. 6 is illustrated in FIG. 11. As may be seen more clearly in FIG. 11 than in FIG. 6, the cap 43 is provided with a cut-away portion 47 for engagement in bayonet-type fashion with the pin 41 on the head 39 of the conventional bushing 37.

In FIG. 7 there are shown a plurality of parts including two bushing type fittings 19 in accordance with the invention and two bayonet-type caps 43 having internally threaded tops 45 in accordance with the invention. The two fittings 19 and caps 43 may be of slightly different sizes such as ⅛ NPT threaded and ⅜ inch NF threaded fittings, these two being the two common external threads used in the industry for adaptor fittings. Each of the fittings and bushings as seen in the drawing FIG. 7 is provided with its own compartment 49 in the kit. There is also provided in the kit as shown in FIG. 7 a thermocouple 27 designed for engagement with the threaded internal openings 23 of the fittings 19. There is also provided a spiral spring 51 which may be engaged with the internal threads 23 of the fitting 19. It will be understood that the assembly of parts in the compartments 49 will be supplied as a unit for customer use in mounting fittings or thermocouples within thermocouple wells such as shown in the previous drawings.

FIG. 8 shows an enlarged view of the internal threading 23 within the fitting 19. The threading shown in FIG. 8 is adapted particularly for engagement with a spring on the exterior of the thermocouple such as seen more particularly in FIG. 12 where there is shown a thermocouple 27 which has an external spiral spring 51 wound about its surface. The external spring 51 is shown in engagement with threads 23 within the bushing type fitting 19 of the invention which is threaded into threads 17 at the top of the thermocouple well 11 in a manner similar to that shown in the previous drawings.

FIG. 9 is similar to FIG. 8 but shows instead an enlarged sectional view of threading within the fitting 19 suitable for engagement with the external spiral of an armored thermocouple cable.

FIG. 10 is again an enlarged view of the combined threads as seen in FIG. 5 in which threads 53 for the external spiral of an armored thermocouple cable are crossed by threads 55 for engagement with a spiral spring on the exterior of the cable.

FIG. 13 is a sectional view of a thermcouple assembly according to the invention substantially the same as that shown in FIG. 1, but incorporating in addition a thermocouple locking means in the form of a set screw 57 which after the fitting 19 is securely seated and the thermocouple 27 rotated into secure heat conduction contact with the bottom or terminal end 15 of the thermocouple well or detection orifice 11 is rotated into contact with the side wall of the thermocouple to avoid any chance for the thermocouple to back out of contact with the terminal wall of the thermocouple orifice.

FIGS. 14(a) and 14(b) show an external view of a fitting in accordance with the invention incorporating an alternative form of locking device. In this arrangment a strong metal strip 59 having two maleable wings or extensions 61 extending from its end is welded or otherwise secured to the top of the fitting 19. After the thermocouple is positioned in heat conductive contact with the thermocouple orifice the two wings or extension 61 are wrapped about or interlocked with the cable to lock it in position as seen in FIG. 14(b) and prevent it from backing out of the fitting 27.

FIG. 15, as indicated above, shows in particular the connection of the thermocouple leads 29 and 31 to detection leads 63 and 65.

FIG. 16 shows an alternative arrangement for locking the thermocouple within the fitting or at least retarding rotation of the thermocouple after positioning. In FIG. 16 the upper portion 35 of the fitting 19 is provided with opposed slots 69 which it will be understood extend at least in their central portion all the way to and through the internal threads 23, not shown in FIG. 16, and located so that central extensions, not shown, on both arms 71 and 73 of a spring clip 75 may extend through and forcibly contact the surface of the thermocouple to prevent rotation of said thermocouple.

As will be recognized from the foregoing description and drawings, the present invention provides a simplified yet very effective mounting, or adjustable mounting, for a thermocouple within a temperature detection well of a machine.

As various changes could be made in the construction and arrangement of the invention described above without departing from the broad scope of the invention, it is intended that all matter contained in the above description and shown in the accompanying drawings shall be interpreted as illustrative only and not in a limiting sense, and the invention is to be interpreted only as that which comes within the broadest possible valid scope of the appended claims.

I claim:

1. A temperature sensitive thermocouple assembly for facilitating longitudinal adjustment of thermocouple position in a vriable temperature enivironment comprising:
   (a) a unitary hollow bushing type thermo-couple fitting having
      (i) external threads on one end for engagement with the threads in a temperature detection orifice in a machine,
      (ii) substantially continuous internal threads at least at the other end of said fitting for engagement with a spiral covering about the outside of the thermocouple,
      (iii) said external and internal threads extending spirally in the same substantial direction, and
   (b) a thermocouple having resilient spiral flexible armor about at least a portion of its outer surface and extending through the said hollow bushing type fitting with the spiral resilient flexible armor in interengagement with a matching internal thread of said fitting.

2. A temperature sensitive thermocouple assembly for facilitating longitudinal adjustment of thermocouple position in a variable temperature environment comprising:
   (a) a unitary hollow bushing type thermocouple fitting having
      (i) external threads on one end for engagement with the threads in a temperature detection orifice in a machine,
      (ii) substantially continuous internal threads at least at the other end for engagement with a spiral covering about the outside of the thermocouple,
      (iii) said external and internal threads extending spirally in the same substantial direction, and
   (b) a thermocouple having a flexible spring spiraled about the least a portion of its outer surface extending through the said hollow type bushing fitting with the flexible spring in engagement with the internal thread of said fitting.

3. A thermocouple assembly in accordance with either claim 2 or claim 1 additionally comprising a locking means for securing said thermocouple means and its outer flexible spiral wrapping in position.

4. A temperature sensitive thermocouple assembly for facilitating longitudinal adjustment of thermocouple position in a variable temperature environmnet comprising:
   (a) a uitary hollow bushing type thermocouple fitting having
      (i) external threads on one end for engagement at least indirectly with the threads in a temperature detection orifice in a machine,
      (ii) substantially continuous internal threads at least at the other end for engagement with a spiral covering about the outside of the thermocouple,
      (iii) said external and internal threads extending spirally in the same substantial direction,
   (b) a thermocouple having a spiral wrapping about at least a portion of its outer surface extending through the said hollow type bushing fitting with the spiral wrapping in engagement with the internal thread of said fitting, and
   (c) a bayonet cap means adapted at one end for engagement with a male bayonet fitting at one end of a second bushing which has threads at the other end adapted for threading into the temperature detection orifice of a machine, said bayonet cap means at the other end being internally threaded for engagement with the external threads of the hollow bushing type thermocouple fitting.

5. A thermocouple assembly according to claim 4 wherein the spiral covering of the thermocouple is a flexible spring.

6. A thermocouple assembly according to claim 4 wherein the spiral covering of the thermocouple is a flexible spiral armor.

7. A thermocouple assembly in accordance with either claim 5 or claim 6 additionally comprising a locking means for securing said thermocouple means and its outer flexible spiral wrapping in position.

8. A method of mounting a thermocouple in a well in a machine element oomprising:
   (a) providing a unitary hollow bushing type theromcouple fitting having external threads at one end for engaging the threads in a temperature detection orifice in the machine element into which said fitting is adapted to be threadedly engaged plus substantially continuous internal threads at least at the other end for engagement with a spiral covering about the outside of the thermocouple,
   (b) threading a thermocouple having a spiral outer covering into the threads of the hollow bushing type fitting until the distance from the fitting to the detection end of the thermocouple is approximately the distance from bottom of the thermocouple well to the top of the thermocouple well,
   (c) threading the said hollow bushing type thermocouple fitting into internal threads adjacent the top of the thermocouple well, and
   (d) adjusting the position of the thermocouple against the bottom of the thermocouple well in conjunction with the threading of the hollow bushing type fitting into the threads at the top of the thermocouple well.

9. A method of mounting and adjusting a thermocouple in a well in a machine in accordance with claim 8 wherein the thermocouple is initally adjusted to be positioned with a somewhat longer distance between the end of the thermocouple and the bushing type fitting than the distance between the bottom of the thermocouple mounting and the threads at the top of the thermocouple mounting orifice and the thermocouple is automatically rotated within the internal threads of the fitting by contact pressure between the bottom of the thermocouple mounting orfice and the end of the thermocouple to relieve excess contact pressure and adjust the length of the thermocouple extending from the end of the bushing type fitting.

10. A method of mounting and adjusting a thermocouple in a thermocouple well in a machine in accordance with claim 8 wherein the thermocouple is initally adjusted into position with a somewhat shorter distance between the end of the bushing type fitting and the end of the thermocouple than the distance between the bottom of the thermocouple mounting orifice and the threads at the top of the thermocouple mounting orifice and the thermocouple is, after the bushing type fitting is positioned in the threads at the top of the thermocouple mounting orifice, rotated to adjust it downwardly to contact the bottom of the thermocouple mounting orfice whereby the thermocouple is positioned in a position where excess contact pressure may be relieved by rotation of said thermocouple in said bushing if the bushing must subsequently be thightened in the thermocouple well or the assembly otherwise adjusted.

11. A kit for merchandising of thermocouple mounting fittings comprising:
  (a) at least one unitary bushing type fitting having external threads at one end and internal threads at at least the other end, said external threads being adapted to engage with threads within a machine element and said internal threads being adapted for engagement with the spiral surface of a thermocouple wrapping,
  (b) at least one bayonet type cap fitting having internal threads at one end adapted for engagement with the external threads of the fitting of,
  (c) at least one other component of a thermocouple assembly selected from the group consisting of:
    (i) a thermocouple,
    (ii) a spiral wrapping for a thermocouple,
    (iii) locking means for locking a fitting in postion on a thermocouple, and
  (d) a compartmented package for containment of parts (a), (b) and (c).

* * * * *